United States Patent
Schulz

(10) Patent No.: US 7,418,817 B2
(45) Date of Patent: Sep. 2, 2008

(54) STRUCTURAL COMPONENT, ESPECIALLY SHIELDING PART

(75) Inventor: Wolfgang Schulz, Langenzenn (DE)

(73) Assignee: ElringKlinger AG, Dettingen/Erms (DE)

( * ) Notice: Subject to any disclaimer, the term of this patent is extended or adjusted under 35 U.S.C. 154(b) by 469 days.

(21) Appl. No.: 11/060,577

(22) Filed: Feb. 18, 2005

(65) Prior Publication Data

US 2006/0166566 A1    Jul. 27, 2006

(30) Foreign Application Priority Data

Jan. 21, 2005    (DE) ................ 10 2005 003 126

(51) Int. Cl.
 *F01N 7/10*    (2006.01)
(52) U.S. Cl. ..................... 60/323
(58) Field of Classification Search ........ 60/272, 60/302, 322, 323, 324
See application file for complete search history.

(56) References Cited

U.S. PATENT DOCUMENTS 6,230,490 B1 * 5/2001 Suzuki et al. ............ 60/323
6,555,070 B1 * 4/2003 Kruger .................... 422/179
6,702,062 B2 * 3/2004 Kusabiraki et al. ...... 181/240

FOREIGN PATENT DOCUMENTS

| DE | 298 03 904 | 7/1999 |
| DE | 101 39 270 | 2/2003 |
| DE | 102 47 641 | 1/2004 |
| DE | 20 2004 011 555 | 11/2004 |
| JP | 10-274115 | * 3/1997 |

OTHER PUBLICATIONS

K. Cierocki and D. Bridge, Neue Werkstoffee und Entwicklungs—Tools für den Hitzeschutz, MTZ Dec. 2001, Jahrgang 62, pp. 1044-1050.

* cited by examiner

*Primary Examiner*—Thomas Denion
*Assistant Examiner*—Diem Tran
(74) *Attorney, Agent, or Firm*—Roylance, Abrams, Berdo & Goodman, L.L.P.

(57) ABSTRACT

A structural component, especially a shielding part, has structural parts configured at least in part differently in terms of their superficial extension and/or the direction in which they extend. At least one structural part of a first type (10) is provided. Structural parts of a second type (34) are formed from the structural part of the first type (10) such that hollow section-like receiving channels (36) which are curved in at least two directions are molded into the structural part of the first type (10). The receiving channels (36) in one direction of curvature follow the curvature of the structural part of the first type (10). Thermal components, such as, for example, the curved exhaust lines of the exhaust system, can be accommodated in an integrating manner. Effective thermal shielding and noise insulation is ensured by overlapping.

7 Claims, 2 Drawing Sheets

STRUCTURAL COMPONENT, ESPECIALLY SHIELDING PART

FIELD OF THE INVENTION

The present invention relates to a structural component, especially a shielding part, with structural parts configured at least in part differently in terms of their superficial extension and/or the direction in which they extend. At least one of the structural parts of a first type is provided with a curvature.

BACKGROUND OF THE INVENTION

While heat development, for example, of an economical power-optimized diesel engine on the engine block can be very low, this situation in no way applies to "hot zones" as in the manifolds, turbochargers, catalytic converters, etc. Due to the increasingly compact configuration of engines, components which are not thermally "compatible" are increasingly ending up in close proximity. Accordingly, it is necessary, using so-called shielding parts, such as heat shields, to protect thermal engine components facing adjacent heat-sensitive assemblies, such as sensors, fuel lines, pressurized sensors, body parts, etc. The situation is also exacerbated by the compact structure in that the high packing density of the assemblies constricts the cooling air flow in the engine compartment. Noise abatement measures may also contribute to this problem. Thus, for example, plastic bottom plates which are designed to reduce the emergence of noise from the engine compartment onto the roadway under certain circumstances can produce effective insulation with which heat is contained in the engine compartment. Catalytic converters, due to their phased high surface temperature, are considered heat sources which certainly necessitate the use of protective shield barriers. One typical example involves design-engineering measures, such as positioning of the catalytic converter tightly on the manifold of the overall exhaust system. This design principle, which is used for rapid heat-up of the catalytic converter to reduce emissions in the cold starting phase, shifts a strong heat source into the engine compartment where numerous assemblies are crowded in a narrow space. Likewise, one cause of the growing importance of shielding parts such as heat shields is the tendency towards use of thermoplastics. The outstandingly moldable, light and economical materials are becoming noticeably more common in the engine compartment, but require special attention with respect to the ambient temperatures at the application site, relative to the other thermal engine parts (New Materials and Development Tools for Heat Protection, in *MTZ* December 2001, Volume 62, page 1044 ff.).

DE 102 47 641 B3 discloses a structural component, especially in the form of a noise-damping shielding part as a component of the motor vehicle. To improve noise abatement in the known structural component, the pertinent shielding part includes a shielding body with a base edge as a structural part of the first type. It may be mounted on the edge side by angular clamp legs within the engine compartment on the stationary parts there, and shields thermal engine components facing heat-sensitive components.

The shielding body as a structural part of the first type is arched in a U-shape in the middle area, and is configured to be symmetrical in this respect. This middle area is arched in a U-shape on the edge side into the edge areas, and undergoes transition into greater curvature. On the two opposing edge areas, the angular clamps are mounted subsequently as fastening means. The shielding body has two layers of sheet metal, between which a noise-damping and/or heat insulating insulation layer extends. To fasten the cover layers of sheet metal to one another, flanging is used in which the free flared flange of one cover layer superficially encloses the edge area of the other cover layer. To reduce weight, the shielding body is made of aluminum or some other lightweight metal.

The known solution is used preferably for shielding a coupling between the transmission flange and a universal shaft against structure-borne noise originating from the transmission as well as the continuous influence of the temperature radiation of the adjacently extending exhaust pipe. During tests, a reduction of noise emission by 3 dB was achieved in the known solution. In order to achieve the pertinent shielding action, other structural parts of a second type extending in the form of bead-shaped lengthwise, and transverse ribs over the convex outer side of the shielding body extend along the middle area of the first structural part in the form of a shielding body. It is characteristic in this known structuring that the lengthwise ribs extending over the entire length of the shielding body are adjoined by transverse ribs molded on in one piece. The transverse ribs form a type of nub structure, and fit adjacently between two respective transverse ribs of an adjacent lengthwise rib in an alternating sequence at intermediate distances. The edge areas which are curved more dramatically to the outside with the connecting clamps are conversely kept free of the aforementioned ribs. With respect to the interrupted transverse rib structure of the known solution, it is to be expected that stiffness and strength are reduced in this respect. Furthermore, at the transition site to the connecting clamps, stiffening of the shielding body is acquired only by the bent clamp legs which largely define the connection geometry, here of the structural component on the stationary engine components or chassis components. This arrangement limits the possible applications of the known structural part accordingly. The connecting clamps with their bent clamp legs and eye connecting points for penetration of a fastener (screw) on the one hand require installation space and on the other they increase the weight for the known solution. Also, the known solution is unsuitable for thermal insulation of larger areas in the engine compartment.

SUMMARY OF THE INVENTION

An object of the present invention is to provide an improved structural component of the type indicated that retains the advantages of prior solutions that ensures very good sound and heat insulation, that requires less installation space, that can be used in a more versatile manner, that simultaneously increases stiffness and strength, that reduces weight and production costs, and that is especially suited for thermal insulation of larger areas within an engine compartment.

This object is basically attained by a structural component where the structural parts of the second type are formed from a structural part of the first type such that hollow section-like receiving channels which are curved in at least two directions are molded into the structural part of the first type. Respective receiving channels in one direction of curvature follow the curvature of the structural part of the first type. Thermal components, such as, for example, the curved exhaust lines of an exhaust system, can be accommodated in an integrating manner to save installation space. By overlapping with the respective receiving channel, there is effective thermal shielding and shielding of the noise emissions occurring in the form of structure-borne noise or airborne noise. Although the structural component of the present invention is very large in two dimensions, due to the special configuration on the structural parts of the first type and second type, it is stiffened such that excess natural vibrations, which typically have an adverse effect on service life, are also largely precluded.

The receiving channels, which are convex viewed from their outer or top side, are configured as bead-shaped stiffening ribs with an enlarged cross section. They follow the curvature of the first structural part with its two-dimensional extension. In the area of the change in curvature, toward the edge area, stiffening of the entire edge structure of the shielding body thus produced takes place. The shielding body which can be configured in the manner of a flat trough also helps save installation space in conjunction with the integrating accommodation of parts of the exhaust gas system and requires little weight.

Fastening of the structural component to the other engine components can be achieved cost-effectively by known fastening clamps. Screw connections with damper elements can also be used. By different structural parts, the overall structural component can also be stiffened such that a type of shielding armor is implemented with a natural vibration behavior which can be referred to as noncritical so that the structural component solution of the present invention can be used expediently, in particular where major occurrence of vibrations can be expected in operation. In addition to these advantages, the basic structure which has been stiffened in this way results in a clear reduction of sound propagation of noisy engine components.

To keep the thermal burden on the structural component low, preferably the individual receiving channels spaced apart from one another extend on the top of the structural component of the first type which overlaps the respective exhaust section of the engine, while maintaining a definable distance. The force prevailing between the inside of the respective receiving channel and the outside of the exhaust gas lines of the exhaust section also reduces the propagation of unwanted noise emissions.

In another especially preferred embodiment of the structural component of the present invention, the structural part of the first type undergoes transition into a sleeve-like structural part of the third type which is kept essentially free of stiffening elements in the direction of the structural part of the first type over a definable surface area. This surface area is adjoined by another surface area with stiffening elements as a structural part of the fourth type. As a result of this sleeve-like configuration of the structural part of the third type, other heat-critical engine components such as the catalytic converter can be shielded accordingly relative to the environment. With the overall structural component with its individual structural parts joined preferably in one piece to one another, a very large area on the engine is thermally insulated without the occurrence of excess natural vibrations having an adverse effect on service life. By interrupting the structural parts connected in one piece to one another by a structural part kept free of stiffening elements over a definable surface area, sudden stiffness changes occur in the respective shoulders. With the offset planes of the structural component, any vibration which may occur cannot propagate undisturbed through the component. This arrangement results in an additional damping effect of the vibrations which occur, keeping noise emissions low.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
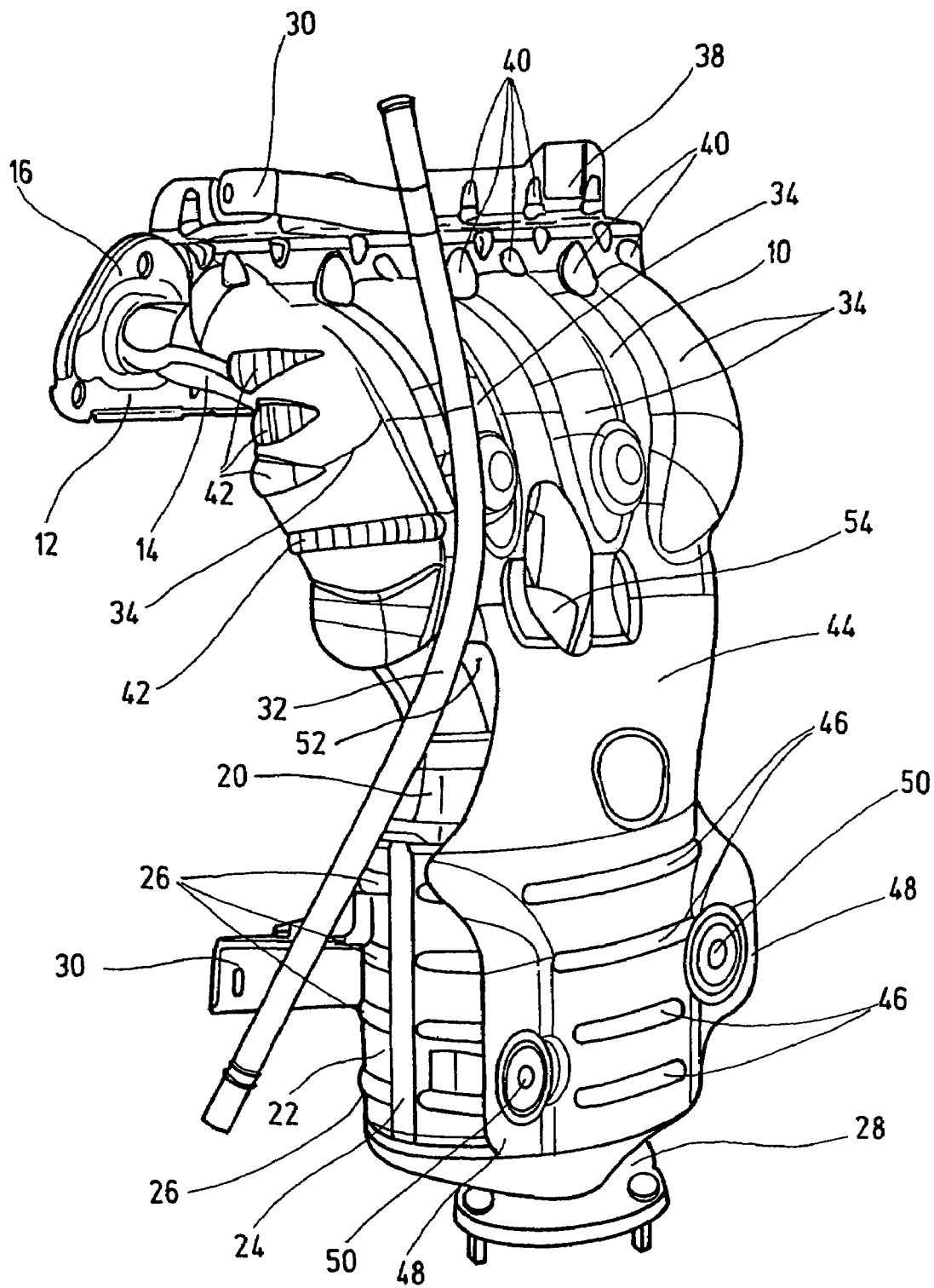
FIG. 1 is a schematic, perspective side view of a structural component in the installed state according to an embodiment of the present invention.
Figure 2:
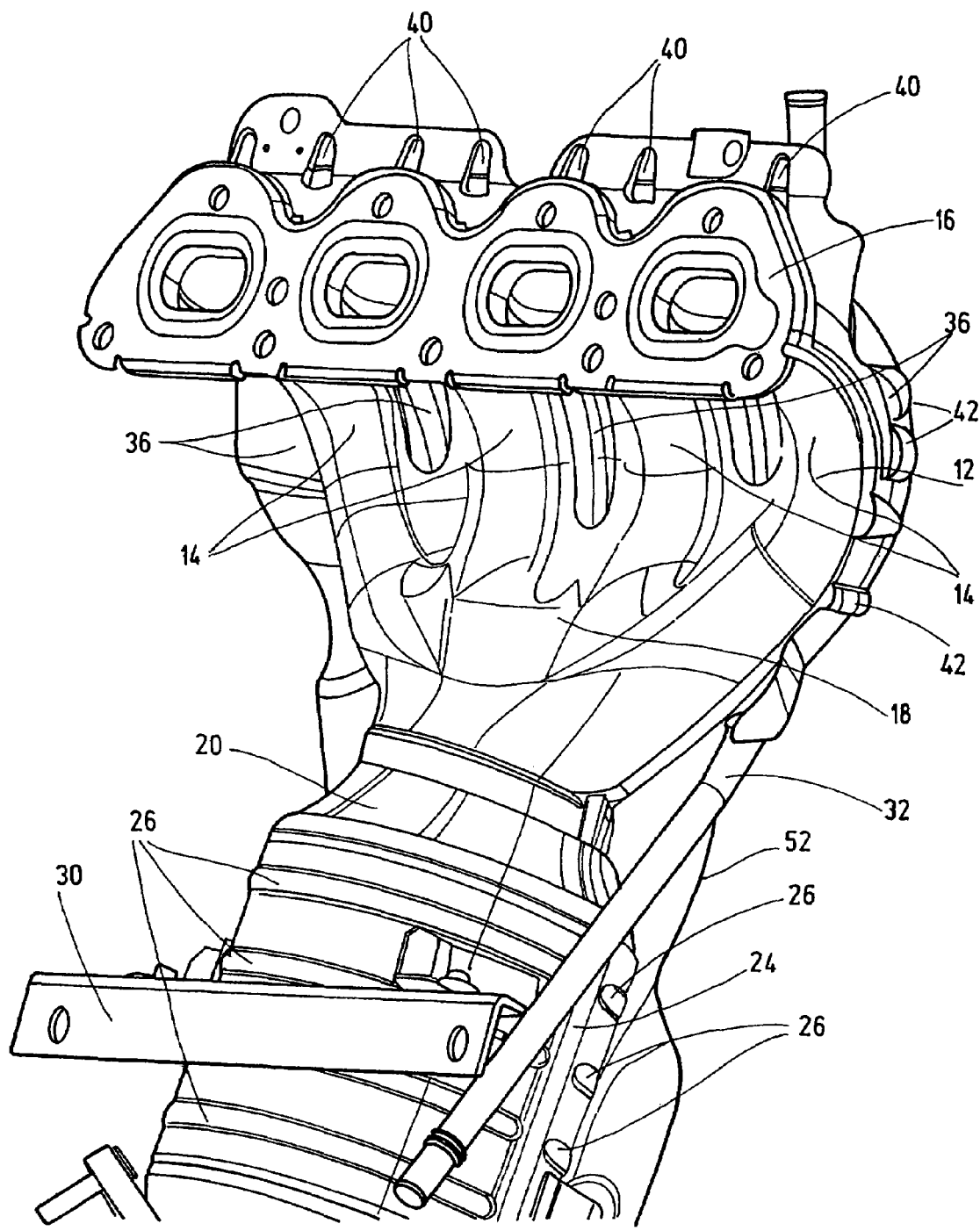
FIG. 2 is a schematic, perspective bottom view of the structural component of FIG. 1 in the installed state with the exhaust section and catalytic converter positioned in front.

FIGS. 1 and 2 show the structural component of the present invention as a whole, configured especially in the form of a shielding part, and designed to thermally insulate larger areas within the engine compartment and to reduce noise emissions in the form of structure-borne and airborne noise. The structural component has structural parts configured differently in terms of their superficial extension and/or the direction in which they extend. At least one structural part of a first type or first structural part 10 is provided with a curvature following the curved path of the exhaust section 12 with its individual exhaust lines 14 (total of four pieces). The exhaust lines 14 with their top discharge into a common connecting flange piece 16 allowing the exhaust section 12 to be connected to a conventional four-cylinder internal combustion engine of a motor vehicle. On its other opposite end, the finger-like exhaust lines 14 discharge into a common connecting piece 20 having the shape of the palm of the hand and in turn undergoing transition by a conically widening enlargement piece into a catalytic converter 22. The catalytic converter is a cylindrical outside peripheral wall of sheet metal parts provided with lengthwise ribs 24 and transverse ribs 26. As shown in FIG. 1, the catalytic converter 22, on its bottom, is provided with a connecting flange 28 to which a conventional vehicle-specific exhaust system can be connected. Supported by retaining devices 30, a tubular connecting body 32 for holding a conventional oil dipstick (not detailed) extends along the structural component. On the top of the structural part of the first type 10, four structural parts 34 of a second type or second structural parts are provided. The structural parts of the second type 34 are formed from the structural part of the first type 10 by receiving channels 36 which are concave in cross section, when viewed from the inside, (cf. FIG. 2), are molded into the structural part of the first type 10.

The structural parts of the first type 10 and second type 34, viewed in the direction of the figures on their top, discharge into an angular connecting piece 38 used to fasten the entire structural component in the area of its top end on the engine components or other vehicle components (not detailed). For stiffening in this area, there are projection-like or nub-like stiffening elements 40 which, especially at the transition of the connecting piece 38 to the structural parts of the second type 34, border them essentially on the edge side and thus stiffen them. At least one outside structural part of the second type 34 has transversely extending stiffening ribs 42 in the edge area of the structural part of the first type 10. The amounts of material which are not needed for the actual structures are placed when the structural component as a whole is being molded, so that otherwise the molding extends essentially smoothly. The structural parts of the second type 34, in the manner of fingers or a glove, extend over the individual exhaust lines 14 and the receiving channels 36 thus configured maintain a definable distance to the top of the exhaust lines 14. The individual exhaust lines 14 with their curved top are routed along the inside of the receiving channels 36, and as a result are at least partially encapsulated in the manner of shielding. In particular, the two outer structural parts of the second type 34 are lengthened with their free edge-side borders and, in this way, in a shell-like manner encompass the two outer edge zones of the exhaust section 12 with its exhaust lines 14 (cf. FIG. 2).

As shown in particular in FIG. 1, the flat structural part of the first type 10 undergoes transition into a sleeve-like structural part of the third type or third structural part 44, which in the direction of the structural part of the first type 10 is kept essentially free of stiffening elements over a definable surface area. This surface area which has been kept free is adjoined by another surface area with stiffening elements 46 as structural parts of the fourth type or fourth structural parts. The stiffening elements 46 are configured in the manner of the projecting transverse ribs, and are molded into the structural part of the third type structural part 44. Elements 46 extend with definable distances to one another essentially transversely to the receiving channels 36 and parallel to the transverse ribs 26 of the enveloping jacket for the catalytic converter 22.

Accordingly, the structural component of the present invention can be divided such that the structural component of the first type 10 with the receiving channels 36 follows the curvature area of the exhaust lines 14 of the exhaust section 12. The structural component of the third type as another shell-shaped (sleeve-like) component partially overlaps the enlargement piece 20 and the catalytic converter 22. Furthermore, the structural components of the second type 34 and fourth type are located in the end-side termination areas of the structural component. The middle area which lies in between is kept free of stiffening elements. Furthermore, the respective stiffening elements 46 extend between two shaped surfaces 48 as structural parts of a fifth type or fifth structural parts. The fifth type structural parts project in the direction of the top of the structural component in the same manner as the individual stiffening elements 46. In addition to additional edge-side stiffening, the shaped surfaces 48 allow insertion of fasteners 50 for fastening the structural component on definable engine components, here in the form of a catalytic converter 22. For good stiffening it has proven favorable to provide at least the respective structural part of the third type 44 with a taper as shown at least on the respectively edge-side transition point 52 from the structural parts of the first type 10 and second type 34. In a trough-shaped depression between two adjacent structural parts of the second type 34 at the site of the transition to the structural part of the third type 44, a recess or depression 54 is designed for insertion of a lambda probe.

As a result of the special structure of the overall component, in the respective shoulders and in the offset planes "sudden changes of stiffness" occur so that any vibrations which may arise cannot propagate undisturbed through the component. As a result, additional damping of vibrations occurs, and a distinctly increased service life of the overall system is achieved. The structural component preferably is made of a conventional steel or sheet metal material, and may be formed of high-grade steel material. The structural component may be made with one or more layers. For a multilayer structure, preferably an insulating intermediate layer of the conventional type is between two cover layers (not shown).

While one embodiment has been chosen to illustrate the invention, it will be understood by those skilled in the art that various changes and modifications can be made therein without departing from the scope of the invention as defined in the appended claims.

What is claimed is:

1. A structural shielding component, comprising:
   at least one first structural part;
   second structural parts formed from said first structural part;
   hollow sectioned receiving channels molded in and extending in a top of said first structural part and curved in two directions, said receiving channels following a curvature of said first structural part in one direction of curvature and being spaced apart from one another, said top overlapping an exhaust section of an engine and maintaining at a definable distance therebetween, one of said second structural parts bordering on an edge side of said first structural part;
   curved exhaust lines extending at least in part in said receiving channels; and
   a third structural part in a form of a sleeve transitioning from said first structural part, said third structural part being essentially free of stiffening elements in a direction of said first structural part over a defined first surface area, said first surface area being adjacent a second surface area of a fourth structural part, said second surface area having stiffening elements, said stiffening elements having transverse ribs spaced from one another and extending transversely to said receiving channels, said first, second, third and fourth structural parts being of metal and configured differently in at least one of superficial extension and extension direction.

2. A structural shielding component according to claim 1 wherein
   said third structural part is tapered at an edge-side transition point between said first and second structural parts.

3. A structural shielding component according to claim 1 wherein
   a depression is between two of said second structural parts at a transition to said third structural part for insertion of a lambda probe.

4. A structural shielding component according to claim 1 wherein
   said third structural part overlaps a catalytic converter adjoining said exhaust section.

5. A structural shielding component according to claim 4 wherein
   said third structural part is spaced a distance from said catalytic converter.

6. A structural shielding component according to claim 1 wherein
   said stiffening elements extend between two shaped surfaces of a fifth structural part, said shaped surfaces projecting and said stiffening elements extending in a direction of said top.

7. A structural shielding component according to claim 6 wherein
   said shaped surfaces are penetrated by fasteners attaching said surfaces on vehicle components.

* * * * *